(12) United States Patent
Honnavalli et al.

(10) Patent No.: US 11,915,295 B2
(45) Date of Patent: Feb. 27, 2024

(54) SYSTEMS AND METHODS FOR AUTOMATICALLY CUSTOMIZING ELECTRONIC COMMERCE

(71) Applicant: International Business Machines Corporation, Armonk, NY (US)

(72) Inventors: Satisha C. Honnavalli, Bangalore (IN); Bharat Khade, Bangalore (IN); Reji Jose, Bangalore (IN); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 17/494,528

(22) Filed: Oct. 5, 2021

(65) Prior Publication Data
US 2023/0106653 A1    Apr. 6, 2023

(51) Int. Cl.
G06Q 30/00 (2023.01)
G06Q 30/0601 (2023.01)
G06Q 30/0201 (2023.01)
G06Q 10/087 (2023.01)

(52) U.S. Cl.
CPC ..... *G06Q 30/0631* (2013.01); *G06Q 30/0201* (2013.01); *G06Q 30/0633* (2013.01); *G06Q 10/087* (2013.01)

(58) Field of Classification Search
CPC .............................................. G06Q 30/06–08
See application file for complete search history.

(56) References Cited

U.S. PATENT DOCUMENTS

| | | |
|---|---|---|
| 8,204,799 B1 | 6/2012 | Murray et al. |
| 8,479,987 B2 | 7/2013 | Bennett et al. |
| 2002/0077931 A1* | 6/2002 | Henrion ......... G06Q 30/02 707/713 |

(Continued)

FOREIGN PATENT DOCUMENTS

KR    20140031990 A    3/2014

OTHER PUBLICATIONS

Disclosed Anonymously. "Cognitive Smart Shopping Cart for Real-Time Shopping Advice." An IP.com Prior Art Database Technical Disclosure. IP.com No. IPCOM000263776D. IP.com Electronic Publication Date: Oct. 2, 2020.

(Continued)

*Primary Examiner* — Ethan D Civan
(74) *Attorney, Agent, or Firm* — Teddi E. Maranzano

(57) ABSTRACT

A computer implemented method for automatically customizing electronic commerce includes analyzing information relevant to the user's purchasing preferences, determining the user's purchasing preferences based on the analysis of the relevant information, determining a shopping list, wherein the shopping list comprises one or more products the user wants to purchase and one or more indications of the user's purchasing preferences for each of the one or more products, generating one or more digital shopping carts based on the shopping list, comparing a product in at least one of the one or more digital shopping carts to a corresponding product and a corresponding purchasing preference on the shopping list, determining one or more preferred digital shopping carts based on the comparison, and displaying to the user the one or more preferred digital shopping carts.

20 Claims, 8 Drawing Sheets

(56) References Cited

U.S. PATENT DOCUMENTS

| | | | |
|---|---|---|---|
| 2003/0023499 A1* | 1/2003 | Das | G06Q 30/0613 |
| | | | 705/26.81 |
| 2012/0303479 A1* | 11/2012 | Derks | G06Q 30/00 |
| | | | 705/26.8 |
| 2014/0067564 A1* | 3/2014 | Yuan | G06Q 30/0641 |
| | | | 705/16 |
| 2014/0095285 A1* | 4/2014 | Wadell | G06Q 30/00 |
| | | | 705/26.7 |
| 2017/0124639 A1 | 5/2017 | Minsky et al. | |
| 2017/0221119 A1* | 8/2017 | Pellow | G06Q 30/0643 |
| 2018/0174225 A1 | 6/2018 | Kumar et al. | |
| 2019/0080387 A1 | 3/2019 | Maenpaa et al. | |

OTHER PUBLICATIONS

Disclosed Anonymously, "Cognitive Smart Shopping Cart for Real-Time Shopping Advice," IP.com, Oct. 2, 2023, IP.com No. IPCOM000263776D, Retrieved from the Internet: <URL: https://priorart.ip.com/IPCOM/000263776>.

* cited by examiner

| Product | Size / Qty | Brand |
|---|---|---|
| Body Wash | 1 | DOVE |
| Moisturizer | 50g | NIVEA |
| Shampoo | 250mL | HEAD AND SHOULDERS |
| Shoe Polish | 1 | N/A |
| Soda | 2L | N/A |
| Shoes | 1 | NIKE |
| Ice Cream | 500g | BASKIN ROBBINS |

| User-Input Shopping List | | | Brand Preference | | Cost Preference | | Delivery Preference | | Quality Preference | | Usage Period Pref. | | No Preference |
|---|---|---|---|---|---|---|---|---|---|---|---|---|---|
| Product | Size / Qty | Brand | Y/N | Preference | Y/N | Preference | Y/N | Preference | Y/N | Preference | Y/N | Preference | |
| Body Wash | 1 | DOVE | Y | DOVE or OLAY | N | n/a | N | n/a | N | n/a | N | n/a | n/a |
| Moisturizer | 50g | NIVEA | N | n/a | Y | $8 - $18 | N | n/a | N | n/a | N | n/a | n/a |
| Shampoo | 250mL | HEAD AND SHOULDERS | N | n/a | N | n/a | Y | 15th of month | N | n/a | N | n/a | n/a |
| Shoe Polish | 1 | N/A | N | n/a | N | n/a | N | n/a | Y | 4 star + | Y | n/a | n/a |
| Soda | 2L | N/A | N | n/a | Y | $80 - $120 | N | n/a | N | n/a | N | 10 days prior to exp. | n/a |
| Shoes | 1 | NIKE | Y | NIKE | N | n/a | N | n/a | N | n/a | N | n/a | n/a |
| Ice Cream | 500g | BASKIN ROBBINS | N | n/a | N | n/a | N | n/a | N | n/a | N | n/a | Y |

SYSTEMS AND METHODS FOR AUTOMATICALLY CUSTOMIZING ELECTRONIC COMMERCE

TECHNICAL FIELD

The present application relates to systems and methods for electronic commerce and, more particularly, to systems and methods for automatically customizing electronic commerce.

BACKGROUND

Electronic commerce ("e-commerce") is increasing in popularity, and with that, so is competition between e-commerce retailers. In order to make more sales, e-commerce retailers must be able to provide its customer with the products they want in terms of price, brand, deliver, and quality.

E-commerce presents different problems to its customers than it does to the e-commerce retailers. In order to locate a product, a customer must often research the offerings of multiple e-commerce retailers to determine which e-commerce retailer can provide a product that meets the user's preferences in terms of price, brand, delivery, and quality. This is a time consuming activity. In addition, in choosing to purchase a product from one e-commerce retailer, the customer may forfeit offers and promotions of another e-commerce retailer.

For example, consider a customer in need of twenty products. The user has a brand preference for five products, has a cost preference for twelve products, and finds it acceptable to receive three products a week after ordering them. In order to choose an e-commerce retailer to purchase the twenty products from, the user must research the product offerings of multiple e-commerce retailers and analyze how well the product offerings meet the user's preferences. Based on that research and analysis, the customer chooses to purchase products from the e-commerce retailer that can provide the products that best meet the customer's preferences.

Systems and methods are needed that will automatically customize electronic commerce.

SUMMARY

Embodiments of the present invention address and overcome one or more of the above shortcomings and drawbacks, by providing systems and methods for automatically customizing electronic commerce.

According to some embodiments, a computer implemented method for automatically customizing electronic commerce is provided. The method may comprise analyzing information relevant to the user's purchasing preferences, determining the user's purchasing preferences based on the analysis of the relevant information, determining a shopping list, generating one or more digital shopping carts based on the shopping list, comparing a product in at least one of the one or more digital shopping carts to a corresponding product and a corresponding purchasing preference on the shopping list, determining one or more preferred digital shopping carts based on the comparison, and displaying the one or more preferred digital shopping carts to the user. The shopping list may comprise one or more products the user wants to purchase and one or more indications of the user's purchasing preferences for each of the one or more products. Various enhancements, refinements, and other modifications can be made to the aforementioned computer implemented method in different embodiments. The following are examples.

In some embodiments, the determining a shopping list further may comprise receiving the shopping list and updating the shopping list based on the user's purchasing preferences. In some embodiments, the determining a shopping list further may comprise generating the shopping list based on the user's purchasing preferences. In some embodiments, the user's purchasing preferences include preferences of one or more of brand, quality, cost, delivery, and openness to suggestion. In some embodiments, the determining the user's purchasing preferences may comprise determining the user has exclusively purchased a product of a particular brand, determining that the user has a brand preference for the product, and determining the user's brand preference for the product is for the particular brand. In some embodiments, the determining the user's purchasing preferences may comprise determining a range of prices at which the user has purchased a product, determining the user has a cost preference for the product, and determining that the user's cost preference for the product is the range of prices. In some embodiments, the determining the user's purchasing preferences may comprise determining a timeframe within which a product is delivered to the user, determining the user has a delivery timeframe preference for the product, and determining the user's delivery preference for the product is the timeframe. In some embodiments, the determining the user's purchasing preferences may comprise determining the user has an upcoming event for which the user needs a product, determining that the user has a delivery timeframe preference for the product, and determining that the user's delivery preference for the product is before the event. In some embodiments, the determining the user's purchasing preferences may comprise determining that the user has reviewed a product, determining that the user has a quality preference for the product, and determining that the user's quality preference for the product is consistent with the review. In some embodiments, the determining the user's purchasing preferences may comprise determining that the user has only purchased a product with a minimum product rating, determining that the user has a quality preference for the product, and determining that the user's quality preference for the product is the minimum product rating. In some embodiments, the determining the user's purchasing preferences may comprise determining that the user purchases a product within a timeframe before the product's expiration date, determining that the user has an usage preference for the product, and determining that the user's usage preference for the product is to purchase the product within the timeframe before the product's expiration date. In some embodiments, the determining the user's purchasing preferences may comprise, determining the user has only purchased a product of a limited number of brands and, if the limited number of brands are unavailable, the user does not purchase the product, and determining that the user is not open to suggestion.

In some embodiments, the generating one or more digital shopping carts may comprise, for each of one or more retailers, determining that a retailer has an in-stock product that corresponds to a product on the shopping list, placing the in-stock product into a digital shopping cart associated with the retailer, and repeating the prior steps for each product on the shopping list. In some embodiments, the generating one or more digital shopping carts may comprise determining that a retailer has an in-stock product that corresponds to a product on the shopping list, placing the in-stock product into a digital shopping cart, determining that another retailer has an in-stock product that corresponds to another product on the shopping list, and placing the in-stock product that corresponds to the other product into the digital shopping cart.

In some embodiments, the comparing a product in at least one of the one or more digital shopping carts to a corresponding product and a corresponding purchasing preference on the shopping list, for at least one of the one or more digital shopping carts, may further comprise identifying a list product to be scored, wherein the list product is a product on the shopping list, identifying a cart product that corresponds to the list product, comparing the cart product to one or more purchasing preferences associated with the list product, assigning a purchasing preference weight to each of the one or more purchasing preferences, assigning a purchasing preference score to each of the one or more purchasing preferences, calculating a weighted purchasing preference score for each of the one or more purchasing preferences, calculating a product score, and calculating a cart score. In such embodiments, the cart product may be a product in one of the one or more digital shopping carts, the purchasing preference weight may represent a relative importance of the one or more purchasing preference, the purchasing preference score may represent how well the cart product matches the one or more purchasing preferences, the weighted purchasing preference score may be the product of the purchasing preference weight and the purchasing preference score of the one or more purchasing preferences, the product score may be the average of the weighted purchasing preference scores for each of the one or more purchasing preferences, and the cart score may be the sum of the product scores for each product in the one or more digital shopping carts. Further, in such embodiments, the assigning a purchasing preference score may further comprise determining there is no cart product associated with the list product and assigning a purchasing preference score of zero for each of the one or more purchasing preferences associated with the list product. In addition, in such embodiments, the assigning a purchasing preference score may further comprise determining that the cart product meets one of the one or more purchasing preferences associated with the list product and assigning a purchasing preference score a perfect score for the one of the one or more purchasing preferences. Also, in such embodiments, the determining one or more preferred digital shopping carts may comprise identifying one or more digital shopping carts with the highest total cart scores.

According to some embodiments, a system for automatically customizing electronic commerce comprises a preference analysis device configured to analyze information relevant to a user's purchasing preferences and determine, based on the analysis of the relevant information, the user's purchasing preferences, a shopping list device configured to determine a shopping list, a cart generation device configured to generate one or more digital shopping carts based on the shopping list, a cart scoring device configured to compare a product in at least one of the one or more digital shopping carts to a corresponding product and a corresponding purchasing preference on the shopping list and determine one or more preferred digital shopping carts based on the comparison, and an end user device configured to display the one or more preferred digital shopping carts to the user; and one or more databases configured to store information relevant to the user's purchasing preferences. The shopping list may comprise one or more products the user wants to purchase and one or more indications of the user's purchasing preferences for each of the one or more products.

According to some embodiments, a computer program product for generating digital shopping carts comprises a computer readable storage medium having program instructions embodied therewith. The program instructions executable by a processor may cause the processor to analyze information relevant to a user's purchasing preferences, determine the user's purchasing preferences based on the analysis of the relevant information, determine a shopping list, generate one or more digital shopping carts based on the shopping list, compare a product in at least one of the one or more digital shopping carts to a corresponding product and a corresponding purchasing preference on the shopping list, determine one or more preferred digital shopping carts based on the comparison, and display the one or more preferred digital shopping carts to the user. The shopping list may comprise one or more products the user wants to purchase and one or more indications of the user's purchasing preferences for each of the one or more products.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 5 is an illustrative example of a user-inputted shopping list.

FIG. 6 is an illustrative example of an updated shopping list.

DETAILED DESCRIPTION OF EXEMPLARY EMBODIMENTS

Figure 1:
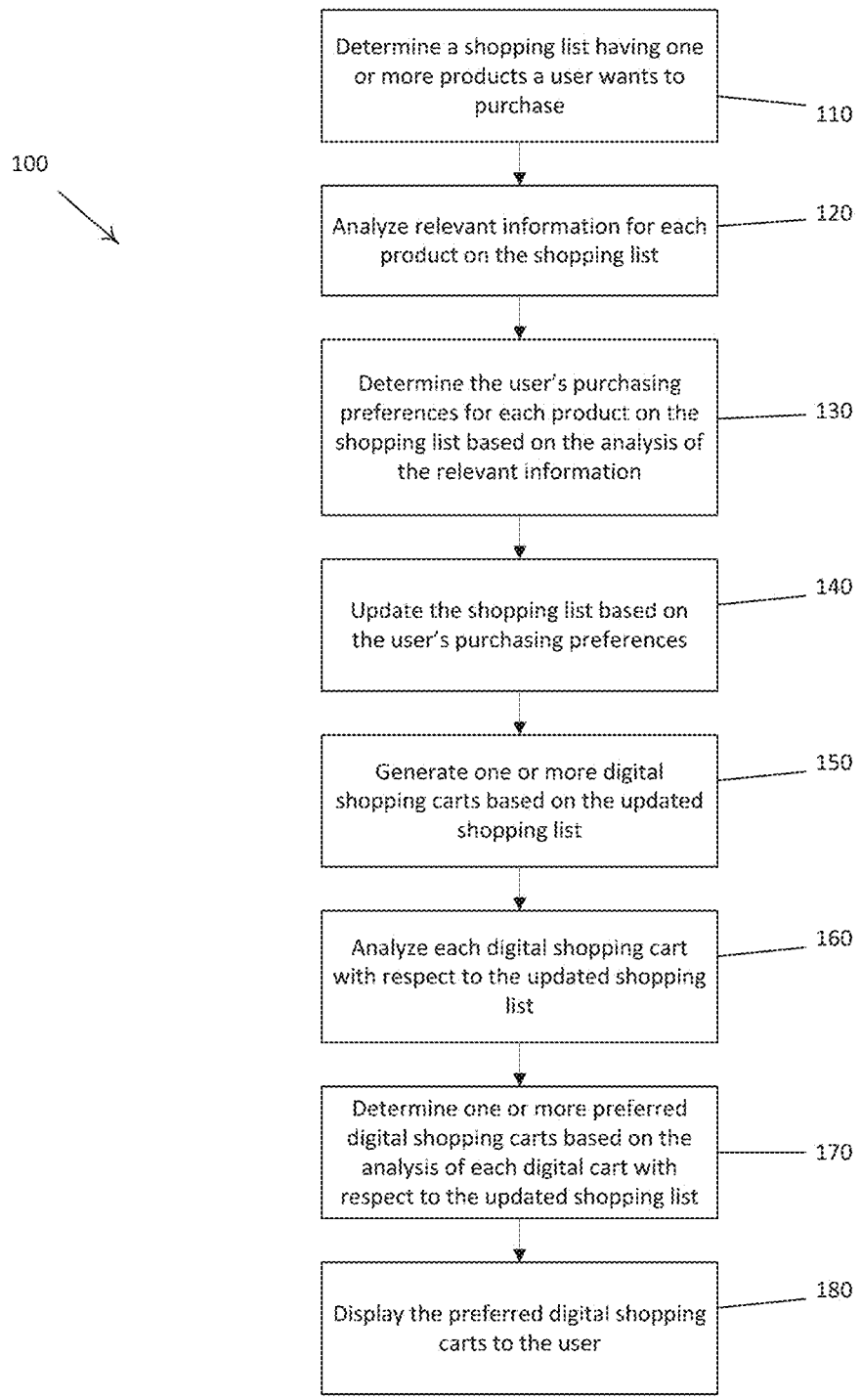
FIG. 1 is an embodiment of a method for automatically customizing electronic commerce in which the user inputs a shopping list that is updated by the system.

Embodiments of the present invention may be a system, a method, or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The disclosed embodiments provide systems and methods for automatically customizing electronic commerce.

Method for Automatically Customizing Electronic Commerce

Some embodiments of the present disclosure are directed to a method for automatically customizing electronic commerce.

FIG. 1 is an embodiment of a method for automatically customizing electronic commerce in which the user inputs a shopping list that is updated by the system. This process may occur, for instance, when a person is shopping on an online marketplace for one or more products.

In step 110, a shopping list is determined. The shopping list may include one or more products a user wants to purchase. In an embodiment, this step is performed by a Shopping List Module receiving a shopping list input by a user via an User Device. FIG. 5 is an illustrative example of a user-inputted shopping list 500. In another embodiment, the user selects a shopping list from a list of pre-existing shopping lists stored by the Shopping List Module. A pre-existing shopping list may be a shopping list the user has previously input into the system or a shopping list previously generated by the system.

In step 120, information relevant to a user's purchasing preferences is analyzed to determine the user's preference(s) for each product on the shopping list. In an embodiment, this step is performed by a Preference Analysis Module. In step 130, the user's purchasing preferences for each product on the shopping list are determined based on the analysis in step 120. In an embodiment, this step is performed by the Preference Analysis Module 800.

In step 140, the shopping list is updated, creating an updated shopping list, based on the user's purchasing preferences. FIG. 6 is an illustrative example of an updated shopping list 600. In an embodiment, this step is performed by a Shopping List Module.

In step 150, one or more digital shopping carts are generated based on the updated shopping list 600. In an embodiment, one digital shopping cart is generated for each of a plurality of retailers. In another embodiment, one or more digital shopping carts are generated with products from different retailers. In some embodiments, this step is performed by a Cart Generation Module.

Figure 2:
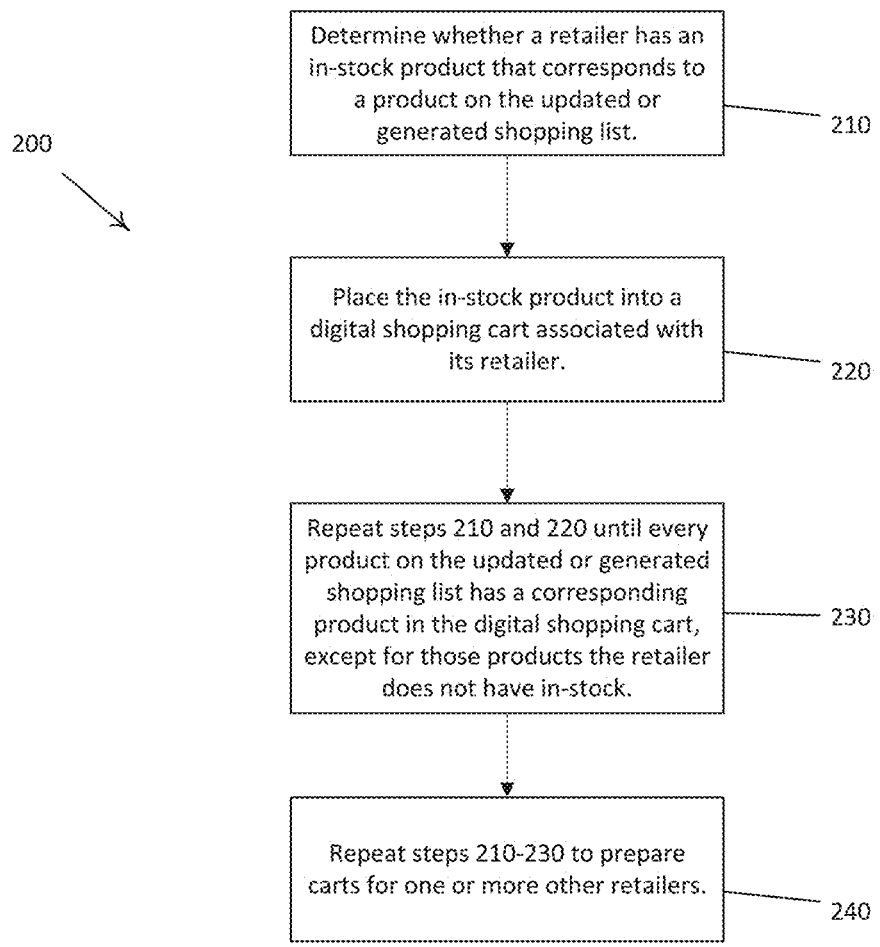
FIG. 2 is an embodiment of a method for generating one or more digital shopping carts based on the updated shopping list.

FIG. 2 is an embodiment of a method for generating one or more digital shopping carts based on the updated shopping list 600. In step 210, a determination is made as to whether a particular retailer has an in-stock product that corresponds to a product on the updated shopping list 600. In step 220, a digital placeholder representing the in-stock product is placed into a digital shopping cart associated with that retailer. In other words, the in-stock product is placed into a digital shopping cart. In step 230, steps 210 and 220 are repeated until every product on the updated or generated shopping list has a corresponding product in the digital shopping cart, except for those products the retailer does not have in-stock. In step 240, steps 210-230 are repeated to prepare carts for one or more other retailers.

The method described in FIG. 2 may also be performed using a generated shopping list instead of the updated shopping list 600.

Returning to FIG. 1, in step 160, each digital shopping cart is analyzed with respect to the updated shopping list 600. In some embodiments, this step is performed by a Cart Scoring Module.

Figure 3:
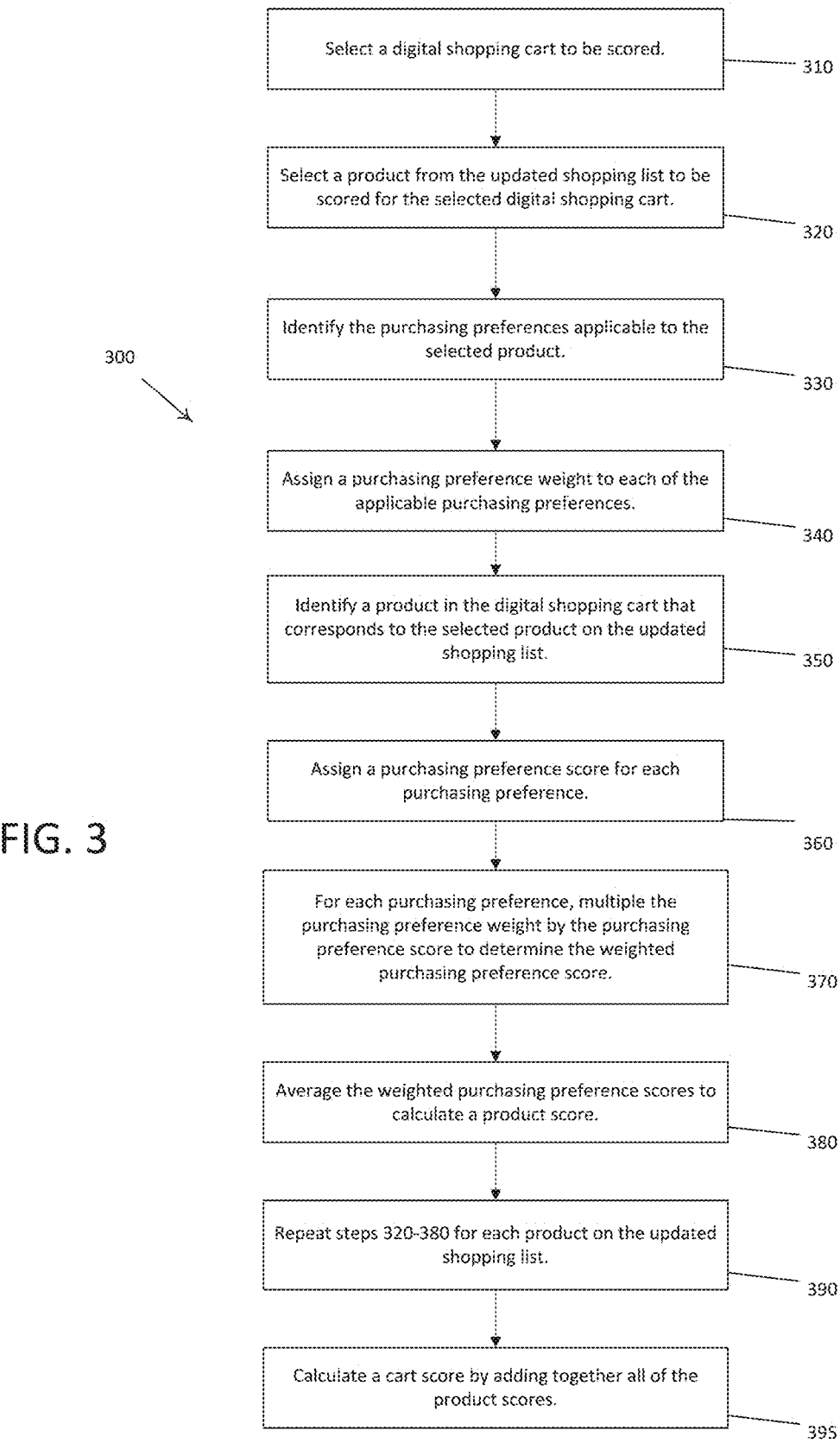
FIG. 3 is an embodiment of a method of scoring digital shopping carts.

FIG. 3 is an embodiment of a method of scoring digital shopping carts that may be used in step 160. In an embodiment, a cart score is calculated by summing product scores for each item on the updated shopping list 600.

At step 310, a digital shopping cart is selected to be scored. At step 320, a product on the updated shopping list 600 is selected to be scored for the selected digital shopping cart. For example, using FIG. 6 as an example, Shoes are selected from the updated shopping list 600 to be scored for the selected digital shopping cart.

At step 330, the purchasing preferences applicable to the selected product are identified. For example, the purchasing preferences applicable to Shoes are brand and cost preferences. A product may have one purchasing preference, multiple purchasing preferences, or no purchasing preferences at all.

At step 340, each applicable purchasing preference is assigned a purchasing preference weight based on the relative importance of the purchasing preferences. Information relevant to a user's purchasing preferences is analyzed to determine the purchasing preference weight for each product on the shopping list. In an embodiment, this step is performed by a Preference Analysis Module. For example, the user's brand preference may be more important than the user's cost preference. In an embodiment, the user's brand preference may have a greater purchasing preference weight than the user's cost preference. In an embodiment, the user's brand preference may have a purchasing preference weight of 2 and the user's cost preference may have a purchasing preference weight of 1.5.

At step 350, a product in the digital shopping cart that corresponds with the selected product on the updated shopping list 600 is identified. For example, consider a digital shopping cart with a pair of $150 NIKE shoes. If there is no product in the digital shopping cart that corresponds with the selected product on the updated shopping list 600, the product score may equal zero.

At step 360, a purchasing preference score is assigned for each purchasing preference based on how well the product in the digital shopping cart corresponds to the selected product on the updated shopping list 600. In some embodiments, the product scores may range from 0-1. For example, the updated shopping list 600 indicates that the user has a brand preference for NIKE shoes. Because the shoes in the digital shopping are NIKE, the purchasing preference score for brand preference may be 1. The updated shopping list 600 indicates that the user has a cost preference for shoes between $80-$120. Because the shoes in the digital shopping cart are not within that range, the purchasing preference score for cost preference may be less than 1. For example, the purchasing preference for cost preference may be 0.8.

At step 370, a weighted purchasing preference scores is calculated for each purchasing preference. The weighted purchasing preference score is calculated by multiplying the purchasing preference weight by the purchasing preference score. For example, the weighted purchasing preference score for brand preference may be 2*1=2 because the purchasing preference weight is 2 and the purchasing preference score is 1. For another example, the weighted purchasing preference score for cost preference may be 1.5*0.8=1.2 because the purchasing preference weight is 1.5 and the purchasing preference score is 0.8.

At step 380, the weighted purchasing preference scores are averaged to calculate a product score. For example, the product score for the shoes may be (2+1.2)/2=1.6.

At step 390, steps 320-380 is repeated for each product on the updated shopping list 600.

At step 395, the product scores of each product on the updated shopping list 600 are added together to calculate the cart score. This method may be performed for each digital shopping cart.

The method described in FIG. 3 may also be performed using a generated shopping list instead of the updated shopping list 600.

Returning to FIG. 1, in step 170, one or more digital shopping carts are determined to be preferred shopping carts based on the analysis of each digital cart with respect to the updated shopping list 600. In an embodiment, this step is performed by a Cart Scoring Module. In step 180, the preferred digital shopping carts are displayed to the user. In an embodiment, this step is performed by a User Device.

Example of an embodiment of a method for automatically customizing electronic commerce. Consider a marketplace having five retailers, and a user who wishes to purchase the following items from a marketplace: bread, eggs, tomatoes, whey protein, perfume, kitchen towel, soap, laundry detergent, toothpaste, and dish washing soap. At step 110, the user inputs a shopping list with those items. At steps 120 and 130, relevant information for each product on the shopping list is analyzed to determines the user's purchasing preferences. At step 140, the user's shopping list is updated with the user's purchasing preferences. TABLE 1 below, is an example of the user's shopping list updated with the user's purchasing preferences.

TABLE 1

| Product | Purchasing Preference | |
|---|---|---|
| Bread | None | n/a |
| Eggs | None | n/a |
| Tomatoes | None | n/a |
| Whey Protein | None | n/a |
| Perfume | Quality | User only purchases perfume with 5 star customer reviews |
| Kitchen Towel | Cost | $3-$8 |
| Soap | Brand | SOFTSOAP |
| Laundry Detergent | Quality | TIDE |
| Toothpaste | Brand | (1) SENSODYNE, (2) COLGATE SENSITIVE |
| Dish Washing Soap | Cost | Cheapest |

At step 150, five digital shopping carts are prepared, one for each of the five retailers, based on the updated shopping list 600. Referring again to FIG. 2, to prepare a digital shopping cart, at step 220, a product on the updated shopping list 600 is identified, a determination is made as to if the retailer has a corresponding in-stock product, and if so, at step 220, the in-stock product is placed in the digital shopping cart. At step 230, those steps are repeated for each product on the updated shopping list 600. TABLES 2 and 3, below, are each an example of a digital shopping cart that may be prepared by the system.

TABLE 2

| Product on Shopping List | Product in Cart |
|---|---|
| Bread | Bread |
| Eggs | Eggs |
| Tomatoes | Tomatoes |
| Whey Protein | Whey Protein |
| Perfume | None |
| Kitchen Towel | $11 |
| Soap | SOFTSOAP |
| Laundry Detergent | TIDE |
| Toothpaste | COLGATE SENSATIVE |
| Dish Washing Soap | $3 |

TABLE 3

| Product on Shopping List | Product in Cart |
|---|---|
| Bread | Bread |
| Eggs | Eggs |
| Tomatoes | Tomatoes |
| Whey Protein | Whey Protein |
| Perfume | Perfume with 5 star customer reviews |
| Kitchen Towel | $5 |
| Soap | SOFTSOAP |
| Laundry Detergent | Generic Brand |
| Toothpaste | SENSODYNE |
| Dish Washing Soap | $8 |

Returning to FIG. 1, at step 160, each digital shopping cart is analyzed with respect to the updated shopping cart. Referring again to FIG. 3, at 310 a digital shopping cart is selected to be scored. For example, consider that the digital shopping cart represented by TABLE 2 is selected for scoring. At step 320, a product from the updated shopping list 600 is selected to be scored for the selected digital shopping cart. For example, consider that toothpaste is selected to be scored. At step 330, purchasing preferences applicable to the selected product are identified. In this example, the user has a brand purchasing preference for toothpaste. The user prefers SENSODYNE but will also accept COLGATE SENSITIVE. At step 340, a purchasing preference weight is assigned to the applicable purchasing preferences. For example, if the user's brand preference for toothpaste is very important, the purchasing preference may be assigned a weight of 2. At step 350, the product in the digital shopping cart that corresponds with the selected product on the updated shopping list 600 is identified. In TABLE 2, the corresponding item is COLGATE SENSITIVE. At step 360, a purchasing preference score is assigned to the corresponding product. Because COLGATE SENSITIVE is the user's second choice, the brand preference score is assigned a score of less than 1, for example, 0.8. In an embodiment, if the brand of toothpaste had been the user's first choice, the brand preference score would have been a perfect score of 1. At step 370, for each purchasing preference, the purchasing preference weight is multiplied by the purchasing preference score to determine the weighted purchasing preference score. In this example, the weighted purchasing preference score would be 2*0.8=1.6. At step 380, the weighted purchasing preference scores for the product are average to calculate a product score. In this example, there is only one weighted purchasing preference score, so the product score is the weighted purchasing preference score. At step 390, steps 320-380 are repeated for each product on the updated shopping list 600. At step 396, a cart score is calculated by adding together all of the product scores in the cart. TABLES 4 and 5, below, are each an example of how a digital shopping cart may be scored.

TABLE 4

| Product on Shopping List | Product in Cart | Purchasing Preference Weight | Purchasing Preference Score | Weighted Purchasing Preference Score | Product Score |
|---|---|---|---|---|---|
| Bread | Bread | 1 | 1 | 1 | 1 |
| Eggs | Eggs | 1 | 1 | 1 | 1 |
| Tomatoes | Tomatoes | 1 | 1 | 1 | 1 |
| Whey Protein | Whey Protein | 1 | 1 | 1 | 1 |
| Perfume | None | 1.5 | 0 | 0 | 0 |
| Kitchen Towel | $11 | 1 | 0.5 | 0.5 | 0.5 |
| Soap | SOFTSOAP | 1.5 | 1 | 1.5 | 1.5 |
| Laundry Detergent | TIDE | 1 | 1 | 1 | 1 |
| Toothpaste | COLGATE SENSITIVE | 2 | 0.8 | 1.6 | 1.6 |
| Dish Washing Soap | $3 | 2 | 1 | 2 | 2 |
| | Cart Score | | | | 10.6 |

TABLE 5

| Product on Shopping List | Product in Cart | Purchasing Preference Weight | Purchasing Preference Score | Weighted Purchasing Preference Score | Product Score |
|---|---|---|---|---|---|
| Bread | Bread | 1 | 1 | 1 | 1 |
| Eggs | Eggs | 1 | 1 | 1 | 1 |
| Tomatoes | Tomatoes | 1 | 1 | 1 | 1 |
| Whey Protein | Whey Protein | 1 | 1 | 1 | 1 |

TABLE 5-continued

| Product on Shopping List | Product in Cart | Purchasing Preference Weight | Purchasing Preference Score | Weighted Purchasing Preference Score | Product Score |
|---|---|---|---|---|---|
| Perfume | Perfume with 5 star customer reviews | 1.5 | 1 | 1.5 | 1.5 |
| Kitchen Towel | $5 | 1 | 1 | 1 | 1 |
| Soap | SOFTSOAP | 1.5 | 1 | 1.5 | 1.5 |
| Laundry Detergent | Generic Brand | 1 | .25 | 0.25 | 0.25 |
| Toothpaste | SENSODYNE | 2 | 1 | 2 | 2 |
| Dish Washing Soap | $8 | 2 | 1 | 2 | 2 |
| | | Cart Score | | | 12.25 |

Returning to FIG. 1, at step 170, one or more preferred shopping carts are determined based on the analysis of the digital shopping carts. In this example, the digital shopping cart of TABLE 5 may be preferred because it has a higher cart score than the digital shopping cart of TABLE 4. At step 180, the preferred digital shopping cart may be displayed to the user. In this example, the digital shopping cart of TABLE 5 may be displayed to the user.

Figure 4:
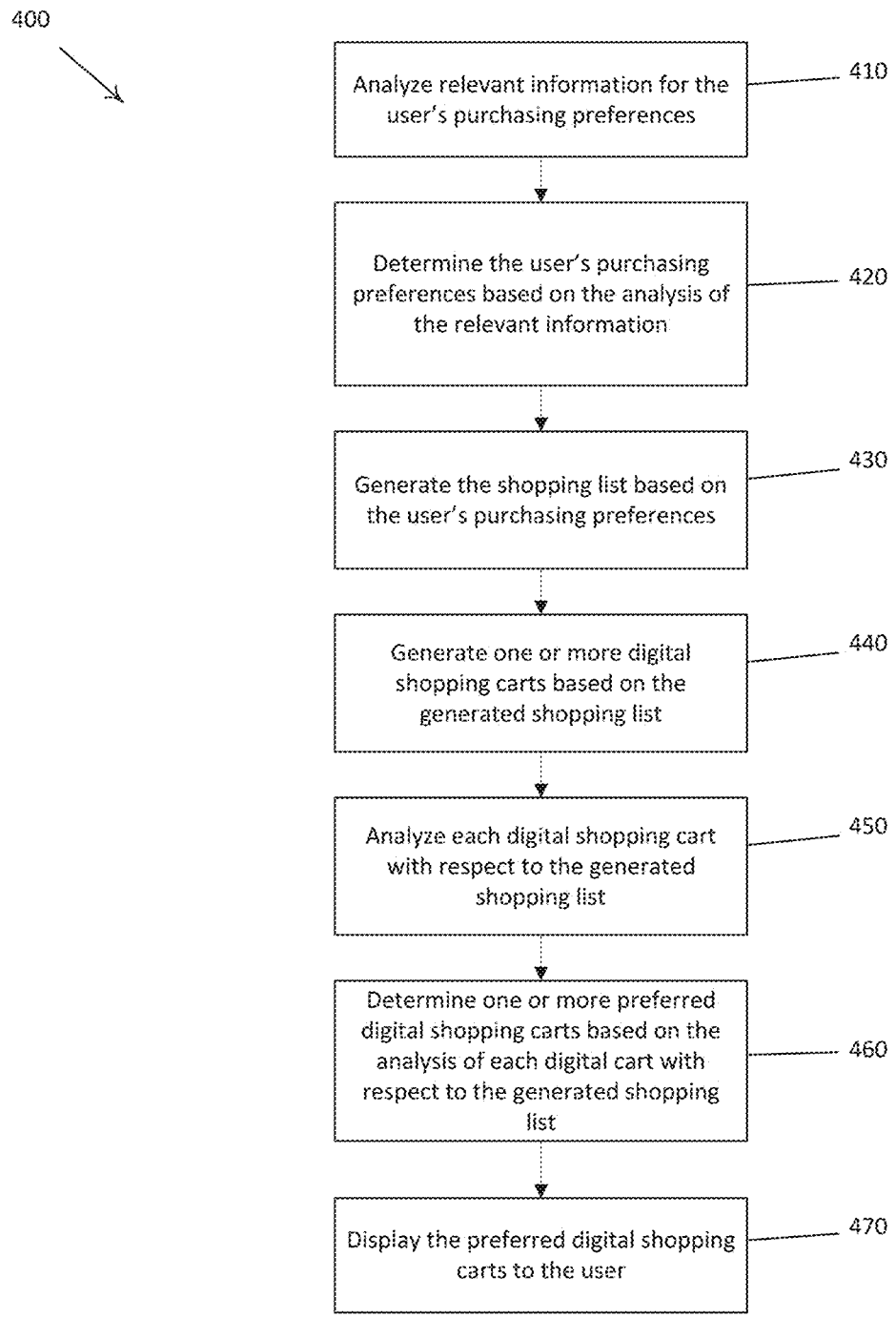
FIG. 4 is an embodiment of a method for automatically customizing electronic commerce in which the system generates a shopping list.

FIG. 4 is an embodiment of a method for automatically customizing electronic commerce in which the system generates a shopping list. In other words, instead of inputting a shopping list and updated that shopping list, the system prepares a generated shopping list with the user's purchasing preferences. This process may occur, for instance, when a user is shopping on an online marketplace for one or more products.

In step 410, relevant information is analyzed to determine the user's preferences. In an embodiment, this step is performed by a Preference Analysis Module. In step 420, the user's purchasing preferences are determined based on the analysis in step 410. In an embodiment, this step is performed by a Preference Analysis Module.

In step 430, a shopping list is generated based off of the user's purchases preferences determined in step 420. The shopping list may include one or more products a user wants to purchase. A generated shopping list may look similar to the updated shopping list 600 shown in FIG. 5. In an embodiment, this step is performed by a Shopping List Module.

In step 440, one or more digital shopping carts are generated based on the generated shopping list. In an embodiment, one digital shopping cart is generated for each of a plurality of retailers. An exemplary embodiment of a method for generating one or more digital shopping carts is discussed above and shown in FIG. 2. With regard to the discussion above, the method uses the generated shopping list instead of the updated shopping list 600. In another embodiment, one or more digital shopping carts are generated with products from different retailers. In an embodiment, this step is performed by a Cart Generation Module.

In step 450, each digital shopping cart is analyzed with respect to the generated shopping list. An exemplary embodiment of a method for analyzing each digital shopping cart with respect to an updated shopping list 600 is discussed above and shown in FIG. 3. With regard to the discussion above, the method uses the generated shopping list instead of the updated shopping list 600. In an embodiment, this step is performed by a Cart Scoring Module. In step 460, one or more digital shopping carts are determined to be preferred shopping carts based on the analysis of each digital cart with respect to the generated shopping list. In an embodiment, this step is performed by a Cart Scoring Module In step 470, the preferred digital shopping carts are displayed to the user. In an embodiment, this step is performed by a User Device.

System for Automatically Customizing Electronic Commerce

Some embodiments of the present disclosure are directed to a system for automatically customizing electronic commerce.

Figure 7:
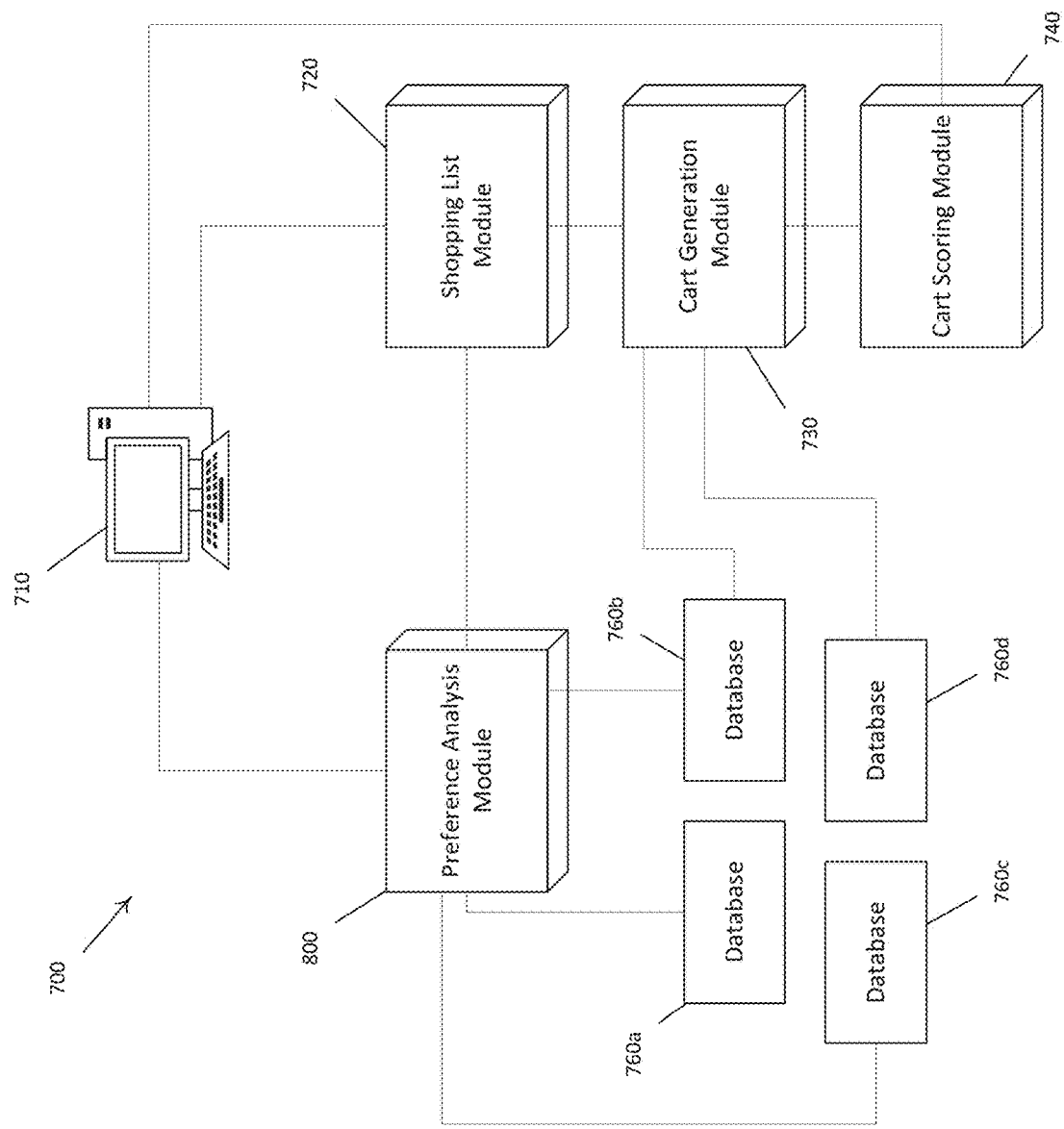
FIG. 7 is a schematic illustrating an embodiment of a system for automatically customizing electronic commerce.

FIG. 7 is a schematic illustrating an embodiment of a system for automatically customizing electronic commerce 700. In some embodiments, the system may be operated on or in conjunction with an ecommerce marketplace having relationships with multiple retailers. For example, this system could be operated on or in connection with ecommerce marketplaces like, for example, Amazon.com and Walmart.com. The system may include a Preference Analysis Module 800, a Shopping List Module 720, a Cart Generation Module 730, a Cart Scoring Module 740, a User Module 710, and one or more databases, 760a-760d.

The one or more databases 760a-760d may be configured to store data. For example, one or more databases may store information relevant to a user's purchasing preferences. For example, one or more databases may store information related to a user's purchase history, a user's social media history, product reviews, recent trends, demographic information, etc. and combinations thereof. With respect to a user's social media history, a database may store a user's history of products the user has "viewed," "liked," "commented on," or "follows." With respect to recent trends, a database may store information that, for example but not limitation, indicates there has recently been a large surge or decline of purchases of a particular product. With respect to demographic information, a database may store information that indicates a particular product is more or less popular depending on demographics, such as geographic location, age groups, socio-economics, gender, race, season, etc. For example, a particular type of shoe (e.g., boots) may sell more in mountainous regions than flat regions, or in areas where hunting is common, or in the fall. In addition, a database may store information that may indicate a future increase or decrease in sales, for example, a celebrity's use or endorsement or a product, current events, and current social media interest. The one or more databases may be configured to send data to the Preference Analysis Module 800 and send and receive data from the Cart Generation Module 730.

In addition, one or more databases may store information related to the products offered by each retailer. For example, a database may store information related to the availability of the product, the product's price, and the product reviews. The one or more databases may be configured to provide data to the Preference Analysis Module 800, the Cart Generation Module 730, or both.

In an embodiment, the data in the system for automatically customizing electronic commerce 700 is stored in a single database. In another embodiment, the data is stored in a plurality of databases. In such an embodiment, databases may only store specific categories of data. For example, a database may only store a user's social media history and another database may only store product reviews. In other embodiments, databases may not be limited to a specific category of data. For example, a system 700 may include several databases, one or more of which store social media history. Other variations are possible.

Preference Analysis Module

Figure 8:
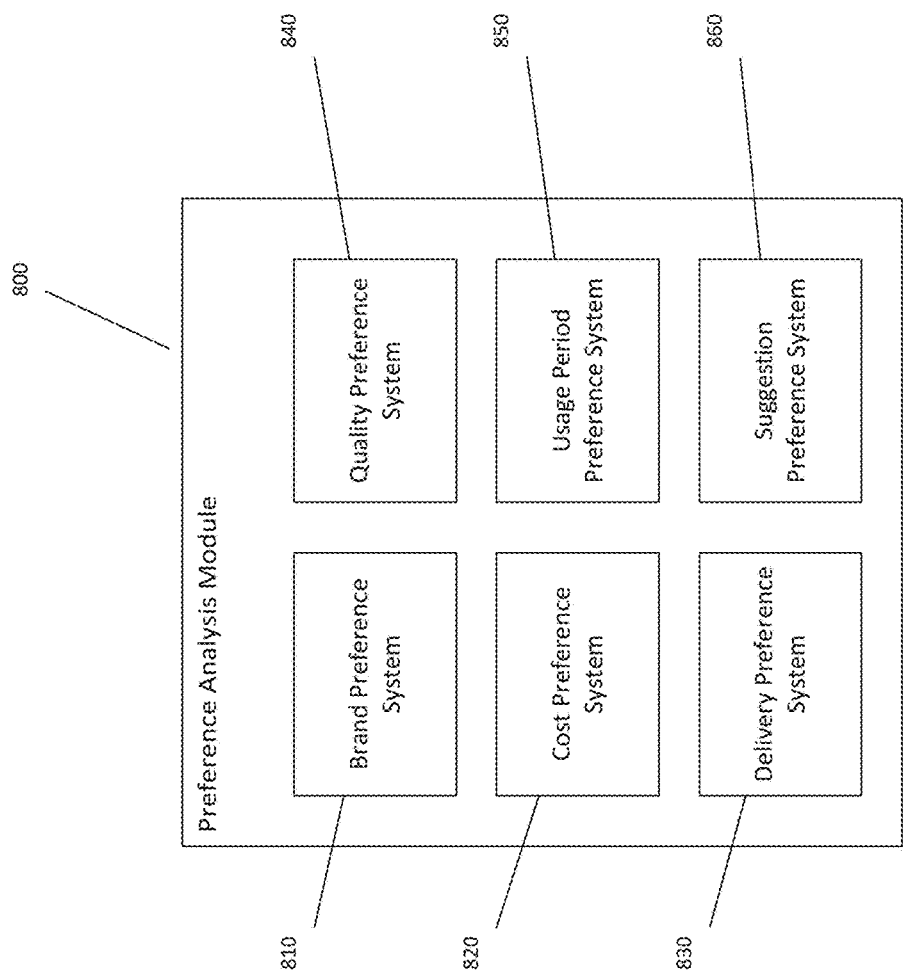
FIG. 8 is a schematic illustrating an embodiment of the Preference Analysis Module.

FIG. 8 is a schematic illustrating an embodiment of the Preference Analysis Module 800. The Preference Analysis Module 800 may be a computing device. The Preference Analysis Module 800 may include components that enable disclosed functions to learn shopping parameters. The Preference Analysis Module 800 may include a processing device and a memory, for example. The Preference Analysis Module 800 may be configured to execute instructions stored in the memory through the processing device to perform a process for automatically customizing electronic commerce.

In an embodiment, the Preference Analysis Module 800 may be a computing device or component (e.g., software or hardware engine or module) configured to analyze information relevant to determine a user's purchasing preferences. In some embodiments, the Preference Analysis Module 800 may be configured to analyze a user's purchase history and social media interactions. Further, the Preference Analysis Module 800 may be configured to analyze product reviews, product trends, and demographic information. For example, the Preference Analysis Module 800 may be configured to receive a user's purchase history and social media interactions from one or more databases. Further, the Preference Analysis Module 800 may be configured to receive product reviews, product trends, and demographic information from one or more databases. In another embodiment, the Preference Analysis Module 800 may store such information. The Preference Analysis Module 800 may analyze this information to determine the user's purchasing preferences. In some embodiments, a user may input the user's purchasing preferences. For example, a new user for which the system 700 has limited data may wish to input the user's purchasing preferences.

In a preferred embodiment, the Preference Analysis Module 800 includes sub-systems configured to analyze relevant information to determine what, if any, purchasing preferences a user has. In a preferred embodiment, the Preference Analysis Module 800 includes a Brand Preference System 810, a Cost Preference System 820, a Delivery Preference System 830, a Quality Preference System 840, a Usage Period Preference System 850, and a Suggestion Preference System 860. However, more or less sub-systems and preferences are possible. The sub-systems of the Preference Analysis Module 800 may be components of a single device, or may be separated devices connected to each other (e.g., via the network). In some embodiments, the Preference Analysis Module 800 may further include or be connected to one or more databases.

Brand Preference System. The Brand Preference System 810 may be a computing device or component (e.g., software or hardware engine or module) configured to analyze information relevant to a user's brand preferences and determine what, if any, preferences a user has with respect to brand.

The Brand Preference System 810 may be a computing device or component (e.g., software or hardware engine or module) configured to analyze information relevant to a user's brand preference and determine what, if any, preferences a user has with respect to brand. In an embodiment, the Brand Preference System 810 may be configured to analyze a user's purchase history. For example, the Brand Preference System 810 may be configured to analyze how often the user purchased a product of a particular brand when purchasing a product compared to how often the user purchased the particular product from other brands. If the user exclusively, or nearly exclusively, purchased the product from a particular brand, the Brand Preference System 810 may determine that the user has a brand preference, with the brand preference being the brand that the user exclusively purchases. If the user does not exclusively, or nearly exclusively, purchase a particular product from a particular brand, the Brand Preference System 810 may determine that the user does not have a brand preference for that particular product.

Other situations are possible. For example, the Brand Preference System 810 may determine that the user purchases a product from one of two brands. In such a case, the Brand Preference System 810 may identify the user as having a brand preference, with the preference being for those two brands. In some embodiments, the Brand Preference System 810 could give one brand priority over another brand. For example, the Brand Preference System 810 may identify that the user always purchases DOVE brand body wash when it is available and, when DOVE brand body wash is unavailable, purchases OLAY body wash. But if neither are available, the user does not purchase body wash. In such a case, the Brand Preference System 810 may determine that the user has a purchasing preference, with the purchasing preference being for DOVE and then OLAY. In such a case, the Cart Generation Module 730 would not place a body wash in a digital shopping cart associated with a retailer that did not have DOVE or OLAY body wash in-stock or available in the user's area.

The Brand Preference System 810 may also determine that a user does not have a brand preference with respect to a particular product.

Cost Preference System. The Cost Preference System 820 may be a computing device or component (e.g., software or hardware engine or module) configured to analyze information relevant to a user's cost preferences and determine what, if any, preferences a user has with respect to cost. In an embodiment, the Cost Preference System 820 may be configured to analyze a user's purchase history to determine how much the user usually has spent on the product. The Cost Preference System 820 may also be configured to analyze the maximum cost at which the user has purchased a particular product.

For example, the Cost Preference System 820 may identify that the user typically purchases a product at a particular cost. In such a case, the Cost Preference System 820 may determine that the user has a cost preference, with the cost preference being that particular cost. For another example, the Cost Preference System 820 may identify that the user has never exceeded a certain cost for a particular product. In such a case, the Cost Preference System 820 may determine that the user has a cost preference, with the cost preference being lower than that particular cost.

The Cost Preference System 820 may also be configured to determine that a user's cost preference is within a certain range. For example, the Cost Preference System 820 may identify that the user usually spends $100 on shoes. In such a case, the Cost Preference System 820 may determine that the user has a cost preference, with the cost preference being a range between $90 and $110 for shoes. This preference may be used to create an updated shopping list 600. By including this range, the Cart Generation Module 730 will have the margin needed to add similarly priced shoes to the cart. In other words, the Cart Generation Module 730 may add a pair of shoes that is on sale for $90, or a pair of shoes that is slightly more expensive at $105. But, the Cart Generation Module 730 will not add a pair of shoes that are $30. This is beneficial because if the user usually purchases $100 shoes, the user is likely not interested in $30 shoes.

The Cost Preference System 820 may also determine that a user does not have a cost preference with respect to a particular product.

Delivery Preference System. The Delivery Preference System 830 may be a computing device or component (e.g., software or hardware engine or module) configured to analyze information relevant to a user's delivery timeframe preference and determine what, if any, preferences a user has with respect to delivery. In an embodiment, the Delivery Preference System 830 is configured to analyze a user's purchase history, purchase feedback, and social media to determine how quickly or slowly the user prefers to receive a particular product.

The Delivery Preference System 830 may identify that a user prefers to receive certain products quickly but the user is indifferent if other products arrive later. For example, the Delivery Preference System 830 may identify that a user does not care how fast the product arrives as long as it arrives within a certain period of time (e.g. 7 days) or by a certain date (e.g., Friday or the 15th of the month). For example, a user may prefer that the user's groceries are delivered on Saturday. In such a case, the Delivery Preference System 830 may determine that the user has a delivery preference, with the delivery preference being delivery by Sunday. For another example, the Delivery Preference System 830 may identify the a user makes repeat purchases at a specific interval. For example, the Delivery Preference System 830 may identify that the user purchases a birthday card before June 15 every year. In such a case, the Delivery Preference System may determine that the user has a delivery preference, with the delivery preference being delivery before June 15.

For another example, the Delivery Preference System 830 may analyze a user's social media interactions and identify that the user is going to a birthday party in a few days. In such a case, the Delivery Preference System 830 may determine that the user has a delivery preference, with the delivery preference being that the product is delivered before the party.

The Delivery Preference System 830 may also determine that a user does not have a delivery timeframe preference with respect to a particular product.

Quality Preference System. The Quality Preference System 840 may be a computing device or component (e.g., software or hardware engine or module) configured to analyze information relevant to a user's quality preference and determine what, if any, preferences a user has with respect to quality. In an embodiment, the Quality Preference System 840 is configured to analyze a product's reviews, the user's reviews on the product, and the user's social media to determine if the user has a quality preference.

For example, the Quality Preference System 840 may be configured to analyze a user's reviews of a product, on the ecommerce marketplace or on the user's social media, to determine if the user has had previous positive or negative experience with a particular product. For example, a user may have left several negative reviews of a particular product, the Quality Preference System 840 may determine that the user is quality conscious for that particular product, with the preference being to not purchase the product for which the user has given negative reviews. The opposite may also be true; a user may have left several positive reviews of a particular product, and the Quality Preference System 840 may determine that the user is quality conscious for that particular product, with the preference being to purchase the product for which the user has given positive reviews. For another example, the user may have written a social media post giving a positive or negative review of a particular product. Similarly, in such a case, the Quality Preference System 840 may determine that the user is quality conscious for that particular product, with the preference being to purchase the product for which the user has written positively about on social media or not to purchase the product for which the user has written negatively about on social media.

For another example, the Quality Preference System 840 may determine that the user only purchases products that have received positive reviews from other purchasers. For example, the Quality Preference System 840 may determine that the user only purchases a particular product if it has a rating of at least four out of five stars. In such a case, the Quality Preference System 840 may determine that the user has a quality preference, with the quality preference being for products with at least four out of five stars.

The Quality Preference System 840 may also be configured to analyze other indications of quality. For example, the Quality Preference System 840 may be configured to analyze whether the user typically purchases high-end products, low-end products, or in-between. In such a case, the Quality Preference System 840 may determine that the user is quality conscious for high-end, low-end, or in-between products, as applicable. For another example, the Quality Preference System 840 may be configured to analyze whether the user typically purchases outlet products. In such a cause, the Quality Preference System 840 may determine that the user is quality conscious for outlet or non-outlet products, as applicable.

The Quality Preference System 840 may determine that the user does not have a quality preference for a particular product.

Usage Period Preference System. The Usage Period Preference System 850 may be a computing device or component (e.g., software or hardware engine or module) configured to analyze information relevant to a user's usage period preferences and determine what, if any, a user's preference is with respect to usage period. In an embodiment, the Usage Period Preference System 850 may be configured to analyze product information and a user's purchasing history. The Usage Period Preference System 850 may identify that certain products that users purchase have expiration dates, like food and cosmetics. For example, the Usage Period Preference System 850 may determine that a user only purchases products that have an expiration date one week from the purchase date. In such a case, the Usage Period Preference System 850 may determine that the user has a usage period preference, with the usage period preference being to purchase the particular product at least a week before the product is to expire.

In addition, the Usage Period Preference System 850 may identify that the user purchases a replacement of an expiring product before the expiring product's expiration date. For example, the user may purchase cosmetics with a six month usage life and, five months after that purchase, the user purchases new cosmetics. In such a case, the Usage Period Preference System 850 may determine that the user has a usage period preference, with the usage period preference being to purchase a replacement product one month before the expiring product's expiration date.

The Usage Period Preference System 850 may determine that the user does not have a usage preference for a particular product.

Suggestion Preference System. The Suggestion Preference System 860 may be a computing device or component (e.g., software or hardware engine or module) configured to analyze information relevant to a user's suggestion preferences and determine what, if any, a user's preference is with respect to suggestions. The Suggestion Preference System 860 determines whether it is acceptable to add an item to the cart that does not comply with the user's purchasing preferences.

In an embodiment, the Suggestion Preference System 860 may be configured to analyze a user's purchasing history. For example, the Suggestion Preference System 860 may identify that the user only purchases DOVE body wash and, if DOVE body wash is unavailable, the user does not purchase body wash. In such a case, the Suggestion Preference System 860 may determine that the user is not open to suggestion. Other embodiments are possible. For example, the Suggestion Preference System 860 may determine that the user only purchases DOVE or OLAY body wash. In such a case, the Suggestion Preference System 860 may determine that the user is not open to suggestion. If a shopping list indicates that the user is not open to suggestion and if a retailer's in-stock product does not match the user's preference, the Cart Generation Module 730 may not add a product to the digital shopping cart for that retailer. In contrast, if a shopping list indicates that the user is open to suggestion, and that a retailer's in-stock product does not match the user's purchasing preference, the Cart Generation Module 730 may add a product to the digital shopping cart for that retailer.

For another example, the Suggestion Preference System 860 may identify that the user usually purchases Dove body wash, and, if Dove body wash is unavailable, the user purchases from another brand. In such a case, the Suggestion Preference System 860 may determine that the user is open to suggestion. In another embodiment, if the Suggestion Preference System 860 may determine that the user is not open to suggestion, the Suggestion Preference System 860 may determine that the user has a brand preference.

Shopping List Module

Returning to FIG. 7, an exemplary system for automatically customizing electronic commerce may include a Shopping List Module 720. The Shopping List Module 720 may include components that enable disclosed functions to generate digital shopping carts options. The Shopping List Module 720 may include a processing device and a memory, for example. The Shopping List Module 720 may be configured to execute instructions stored in the memory through the processing device to perform a process for automatically customizing electronic commerce.

In an embodiment, the Shopping List Module 720 may be configured to receive from the User Device 710 a user-generated shopping list. FIG. 5 is an illustration of an embodiment of a user-generated shopping list 500. In an embodiment, the Shopping List Module 720 may also be configured to update the user-generated shopping list 500 based on the user's purchasing preferences as determined in the Preference Analysis Module 800. FIG. 6 is an illustration of an embodiment of an updated shopping list 600. The updated shopping list 600 may be received by the Cart Generation Module 730.

In another embodiment, the Shopping List Module 720 may be configured to analyze relevant information to generate a shopping list. For example, the Shopping List Module 720 may be configured to analyze recent trends, demographics, a user's purchase history, and social media and generate a shopping list based on that analysis. An embodiment of a generated shopping list may be the same as an embodiment of an updated shopping list 600. In yet another embodiment, the Shopping List Module 720 may be configured to both receive a user-generated shopping list 500 and generate a shopping list.

Cart Generation Module

Returning to FIG. 7, an exemplary for automatically customizing electronic commerce may include a Cart Generation Module 730. The Cart Generation Module 730 may include components that enable disclosed functions to generate multiple digital shopping carts. The Cart Generation Module 730 may include a processing device and a memory, for example. The Cart Generation Module 730 may be configured to execute instructions stored in the memory through the processing device to perform a process for automatically customizing electronic commerce. In an embodiment, the Cart Generation Module 730 may be configured to execute the method described above and in FIG. 2.

In an embodiment, the Cart Generation Module 730 may be configured to receive, from the Shopping List Module 720, an updated shopping list 600 or a shopping list generated by the Shopping List Module 720. The Cart Generation Module 730 may be further configured to generate one or more digital shopping carts based on the updated or generated shopping list. In a preferred embodiment, the Cart Generation Module 730 generates one digital shopping cart for each of a plurality of retailers. The Cart Generation Module 730 may generate these digital shopping carts by placing retailer's in-stock products matching the updated or generated shopping list into a digital shopping cart. The Cart Generation Module 730 may also apply applicable promotions and discounts and determine the total cost to purchase the products in the cart, including, in some embodiments, costs for shipping.

Cart Scoring Module

Returning to FIG. 7, an exemplary system for automatically customizing electronic commerce may include a Cart Scoring Module 740. The Cart Scoring Module 740 may include components that enable disclosed functions to learn shopping parameters and generate digital shopping cart options. The Cart Scoring Module 740 may include a processing device and a memory, for example. The Cart Scoring Module 740 may be configured to execute instructions stored in the memory through the processing device to perform a process for automatically customizing electronic commerce. In an embodiment, the Cart Scoring Module 740 may be configured to execute the method described above and in FIG. 3.

In an embodiment, the Cart Scoring Module 740 may be configured to analyze each of the carts generated by the Cart Generation Module 730 to determine how well the products in the digital shopping carts correspond to the updated or generated shopping list. The Cart Scoring Module 740 may also determine that the digital shopping carts that best match the updated or generated shopping list are preferred carts. Preferred carts may be displayed to the user via the User Device 710.

User Device

The User Device 710 may be an end-user computing device (e.g., a desktop or laptop computer, mobile device, etc.). The User Device 710 may be, for example, a mobile device associated with an individual. The User Device 710 may communicate with the Preference Analysis Module 800, Shopping List Module 720, and Cart Generation Module 730 in relation to, for example, a process for automatically customizing electronic commerce. The User Device 710 may include input/output devices such as display screens and keyboards that enable an individual to access an ecommerce marketplace, input a shopping list, edit a shopping list, make a selection of a digital shopping cart, and make a payment.

The User Device 710 may also be configured to display the preferred shopping carts to the user for selection.

In an embodiment, three to five digital shopping carts are displayed to the user via the User Device 710 to be selected by the user for purchase. In an embodiment, the preferred carts are displayed in such a way that the user can read and compare them easily.

In an embodiment, the display may include information related to each cart's cart score, each cart's total cost, and how well each cart corresponds to the updated or generated shopping list. In an embodiment, how well a cart corresponds to the updated or generated shopping list may be represented by the average of the purchasing preference scores of the products in the cart. For example, the digital shopping cart represented in TABLE 4 corresponds with the updated or generated shopping list 83%, and the digital shopping cart represented in TABLE 5 corresponds with the updated or generated shopping list 92.5%. In another embodiment, how well each cart corresponds to the updated or generated shopping list may be represented by the average of the weighted purchasing preference scores of the products in the cart. For example, the digital shopping cart represented in TABLE 4 corresponds with the updated or generated shopping list 1.06, and the digital shopping cart represented in TABLE 5 corresponds with the updated or generated shopping list 1.225. In another embodiment, how well each cart corresponds to the updated or generated shopping list may be shown on a purchasing preference level. For example, how well a cart corresponds to the updated or generated shopping list on the purchasing preference level may be calculated by averaging the purchasing preference score associated with a particular purchasing preference. For example, the digital shopping cart represented in TABLE 4 corresponds with a quality purchasing preference of 50% because the average of the purchasing preference scores of the products with a quality preference (perfume and laundry detergent) is 50%. In another embodiment, the average of the weighted purchasing preference score may be calculated instead. For example, the digital shopping cart represented in TABLE 4 corresponds with a quality purchasing preference of 0.5. These values may be presented in tabular form for each cart, as illustrated in TABLE 6, below.

TABLE 6

| Purchasing Preference | TABLE 4 Cart | TABLE 5 Cart |
|---|---|---|
| Quality | 50% | 75% |
| Cost | 75% | 100% |
| Brand | 90% | 100% |

Further, the User Device 710 may display text. For example, the following text may be displayed, "Cart 1 shows 90% of your brand preference is met and 20% of your cost preference is met." or "Cart 2 shows 100% of your cost preference is met, 100% of your brand preference is met, and 75% or your quality preference is met." Other variations are possible to show the differences between the digital shopping carts.

In an embodiment, the User Device 710 may be configured to allow the user to select a digital shopping cart for purchase, edit the selected cart, and make a payment. In another embodiment, the User Device 710 may be configured to allow the user to select one or more products from one cart and one or more products from another cart to form a hybrid digital shopping cart to purchase. For example, a user may prefer a hybrid cart when one digital shopping cart option associated with a first retailer meets the user's purchasing preferences for three items on the shopping list and another digital shopping cart option associated with a second retailer meets the user's purchasing preferences for two other items on the shopping list. In such a case, the user may create a hybrid digital shopping cart with the three items from the first retailer and the two items from the second retailer.

Network

The network upon which this system operates may be a local or global network and may include wired, wireless, or both wired and wireless components and functionality which enable internal, external communication, or both internal and external communication for components of the system for automatically customizing electronic commerce. The network may be embodied by the Internet, provided at least in part via cloud services, and/or may include one or more communication devices or systems which enable data transfer to and from the systems and components of the system for automatically customizing electronic commerce.

In accordance with some exemplary embodiments, the marketplace device (e.g. Preference Analysis Module, Shopping List Module, Cart Generation Module, Cart Scoring Module), user device, retailer device (e.g. Preference Analysis Module, Shopping List Module, Cart Generation Module, Cart Scoring Module), or the related components include logic implemented in specialized hardware, software executed on hardware, or any combination of specialized hardware and software executed on hardware, for implementing the system for automatically customizing electronic commerce or related components. In some exemplary embodiments, the marketplace device (e.g. Preference Analysis Module, Shopping List Module, Cart Generation Module, Cart Scoring Module) or any of its components may be or include the IBM Watson™ system available from International Business Machines Corporation of Armonk, N.Y., which is augmented with the mechanisms of the illustrative embodiments described hereafter.

Figure 9:
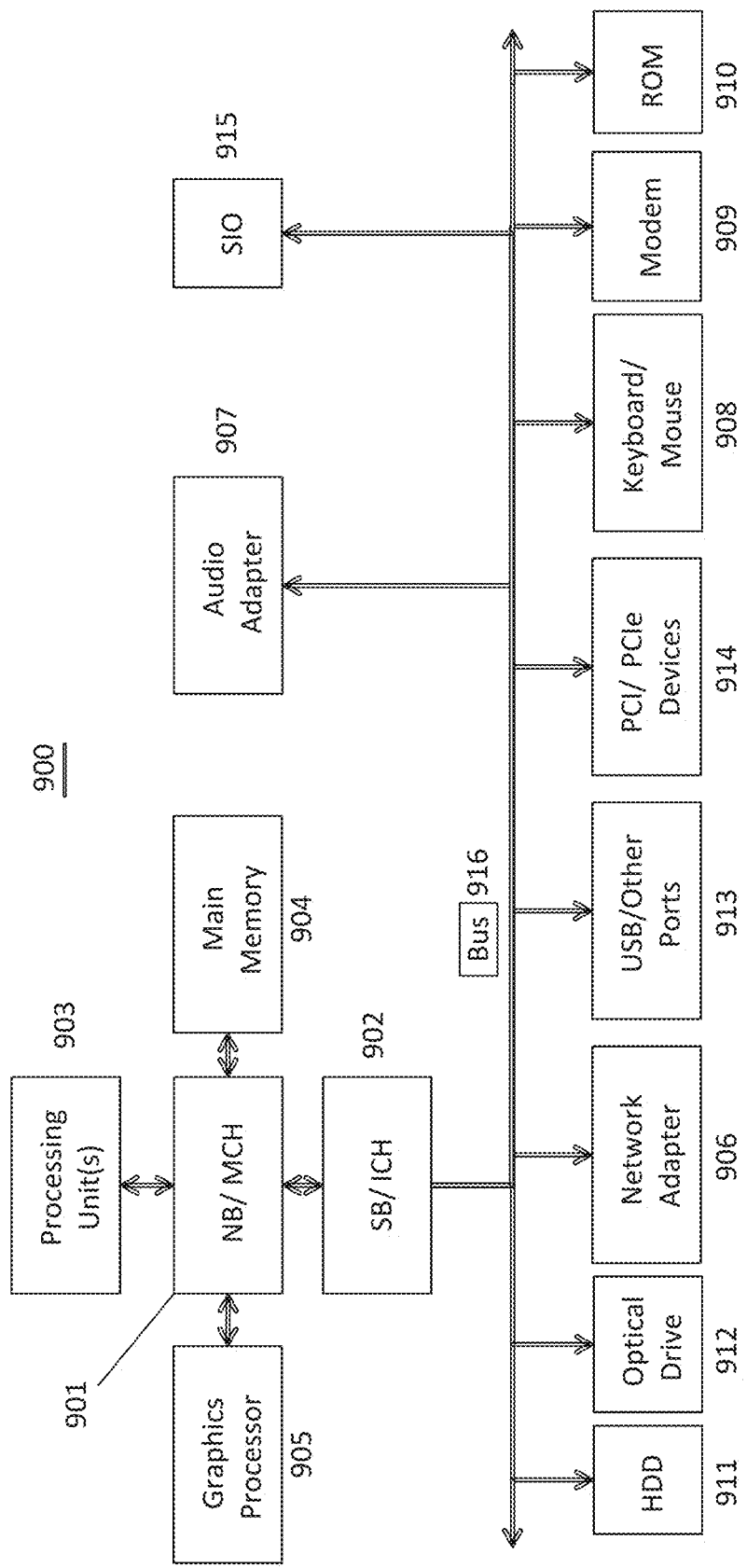
FIG. 9 is a block diagram of an example data processing system in which aspects of the illustrative embodiments may be implemented.

FIG. 9 is a block diagram of an example data processing system 900 in which aspects of the illustrative embodiments may be implemented. Data processing system 900 is an example of a computer in which computer usable code or instructions implementing the process for illustrative embodiments of the present invention are located. In one embodiment, the data processing system 900 represents one or more of the marketplace device (e.g. Preference Analysis Module, Shopping List Module, Cart Generation Module, Cart Scoring Module), the user device 710, or the retailer device (e.g. Preference Analysis Module, Shopping List Module, Cart Generation Module, Cart Scoring Module), and implements at least some of the functional aspects described herein.

In the depicted example, data processing system 900 can employ a hub architecture including a north bridge and memory controller hub (NB/MCH) 901 and south bridge and input/output (I/O) controller hub (SB/ICH) 902. Processing unit 903, main memory 904, and graphics processor 905 can be connected to the NB/MCH 901. Graphics processor 905 can be connected to the NB/MCH 901 through an accelerated graphics port (AGP).

In the depicted example, the network adapter 906 connects to the SB/ICH 902. The audio adapter 907, keyboard and mouse adapter 908, modem 909, read only memory (ROM) 910, hard disk drive (HDD) 911, optical drive (CD or DVD) 912, universal serial bus (USB) ports and other communication ports 913, and the PCI/PCIe devices 914 can connect to the SB/ICH 902 through bus system 916. PCI/PCIe devices 914 may include Ethernet adapters, add-in cards, and PC cards for notebook computers. ROM 910 may be, for example, a flash basic input/output system (BIOS). The HDD 911 and optical drive 912 can use an integrated drive electronics (IDE) or serial advanced technology attachment (SATA) interface. The super I/O (SIO) device 915 can be connected to the SB/ICH 902.

An operating system can run on processing unit 903. The operating system can coordinate and provide control of various components within the data processing system 900. As a client, the operating system can be a commercially available operating system. An object-oriented programming system, such as the Java™ programming system, may run in conjunction with the operating system and provide calls to the operating system from the object-oriented programs or applications executing on the data processing system 900. As a server, the data processing system 900 can be an IBM® eServer™ System P® running the Advanced Interactive Executive operating system or the Linux operating system. The data processing system 900 can be a symmetric multiprocessor (SMP) system that can include a plurality of processors in the processing unit 903. Alternatively, a single processor system may be employed.

Instructions for the operating system, the object-oriented programming system, and applications or programs are located on storage devices, such as the HDD 911, and are loaded into the main memory 904 for execution by the processing unit 903. The processes for embodiments of the web site navigation system can be performed by the processing unit 903 using computer usable program code, which can be located in a memory such as, for example, main memory 904, ROM 910, or in one or more peripheral devices.

A bus system 916 can be comprised of one or more busses. The bus system 916 can be implemented using any type of communication fabric or architecture that can provide for a transfer of data between different components or devices attached to the fabric or architecture. A communication unit such as the modem 909 or network adapter 906 can include one or more devices that can be used to transmit and receive data.

Those of ordinary skill in the art will appreciate that the hardware depicted in FIG. 9 may vary depending on the implementation. For example, the data processing system 900 includes several components which would not be directly included in some embodiments of the system for automatically customizing electronic commerce.

Moreover, other internal hardware or peripheral devices, such as flash memory, equivalent non-volatile memory, or optical disk drives may be used in addition to or in place of the hardware depicted. Moreover, the data processing system 900 can take the form of any number of different data processing systems, including but not limited to, client computing devices, server computing devices, tablet computers, laptop computers, telephone or other communication devices, personal digital assistants, and the like. Essentially, data processing system 900 can be any known or later developed data processing system without architectural limitation.

Computer Program Product for Automatically Customizing Electronic Commerce

Other embodiments of the present disclosure are directed to a computer program product for automatically customizing electronic commerce. In some embodiments, the computer program product comprises a computer readable storage medium having program instructions embodied therewith to cause the processor to execute the methods described herein.

The present description and claims may make use of the terms "a," "at least one of," and "one or more of," with regard to particular features and elements of the illustrative embodiments. It should be appreciated that these terms and phrases are intended to state that there is at least one of the particular features or elements present in the particular illustrative embodiment, but that more than one can also be present. That is, these terms/phrases are not intended to limit the description or claims to a single feature/element being present or require that a plurality of such features/elements be present. On the contrary, these terms/phrases only require at least a single feature/element with the possibility of a plurality of such features/elements being within the scope of the description and claims.

In addition, it should be appreciated that the description uses a plurality of various examples for various elements of the illustrative embodiments to illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description, that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer implemented method for automatically customizing electronic commerce, the method comprising:

analyzing, automatically based on stored information without requiring a further input from a user, information relevant to the user's purchasing preferences, the information relating to a plurality of retailers;

determining, automatically without requiring a further input from the user, based on the analysis of the relevant information, the user's purchasing preferences;

determining, automatically without requiring a further input from the user, a shopping list, wherein the shopping list comprises one or more products the user wants to purchase and one or more indications of the user's purchasing preferences for each of the one or more products;

generating, automatically without requiring a further input from the user, a digital shopping cart for each of the plurality of retailers based on the shopping list;

comparing, automatically without requiring a further input from the user, a product in at least one of the digital shopping carts to a corresponding product and a corresponding purchasing preference on the shopping list;

determining, automatically without requiring a further input from the user, based on the comparison, one or more preferred digital shopping carts; and displaying, to the user, the one or more preferred digital shopping carts.

2. The method of claim 1, wherein the determining a shopping list further comprises:
receiving the shopping list; and
updating the shopping list based on the user's purchasing preferences.

3. The method of claim 1, wherein the determining a shopping list further comprises generating the shopping list based on the user's purchasing preferences.

4. The method of claim 1, wherein the user's purchasing preferences include preferences of one or more of brand, quality, cost, delivery, and openness to suggestion.

5. The method of claim 1, wherein the determining the user's purchasing preferences comprises:
determining the user has a exclusively purchased a product of a particular brand;
determining that the user has a brand preference for the product; and
determining the user's brand preference for the product is for the particular brand.

6. The method of claim 1, wherein the determining the user's purchasing preferences comprises:
determining a range of prices at which the user has purchased a product;
determining the user has a cost preference for the product; and
determining that the user's cost preference for the product is the range of prices.

7. The method of claim 1, wherein the determining the user's purchasing preferences comprises:
determining a timeframe within which a product is delivered to the user;
determining the user has a delivery timeframe preference for the product; and
determining the user's delivery preference for the product is the timeframe.

8. The method of claim 1, wherein the determining the user's purchasing preferences comprises:
determining the user has an upcoming event for which the user needs a product;
determining that the user has a delivery timeframe preference for the product; and
determining that the user's delivery preference for the product is before the event.

9. The method of claim 1, wherein the determining the user's purchasing preferences comprises:
determining that the user has reviewed a product;
determining that the user has a quality preference for the product; and
determining that the user's quality preference for the product is consistent with the review.

10. The method of claim 1, wherein the determining the user's purchasing preferences comprises:
determining that the user has only purchased a product with a minimum product rating;
determining that the user has a quality preference for the product; and
determining that the user's quality preference for the product is the minimum product rating.

11. The method of claim 1, wherein the determining the user's purchasing preferences comprises:
determining the user purchases a product within a timeframe before the product's expiration date;
determining that the user has a usage preference for the product; and
determining that the user's usage preference for the product is to purchase the product within the timeframe before the product's expiration date.

12. The method of claim 1, wherein the determining the user's purchasing preferences comprises:
determining the user has only purchased a product of a limited number of brands and, if the limited number of brands are unavailable, the user does not purchase the product; and
determining that the user is not open to suggestion.

13. The method of claim 1, wherein the generating a digital shopping cart for each of the plurality of retailers comprises, for each of one or more retailers:
determining that a retailer has an in-stock product that corresponds to a product on the shopping list;
placing the in-stock product into a digital shopping cart associated with the retailer; and
repeating the prior steps for each product on the shopping list.

14. The method of claim 1, wherein the generating a digital shopping cart comprises:
determining that a retailer has an in-stock product that corresponds to a product on the shopping list;
placing the in-stock product into a digital shopping cart;
determining that another retailer has an in-stock product that corresponds to another product on the shopping list; and
placing the in-stock product that corresponds to the another product into the digital shopping cart.

15. The method of claim 1, wherein the comparing a product in at least one of the one or more digital shopping carts to a corresponding product and a corresponding purchasing preference on the shopping list, for at least one of the one or more digital shopping carts further comprises:
identifying a list product to be scored, wherein the list product is a product on the shopping list;
identifying a cart product that corresponds to the list product, wherein the cart product is a product in one of the one or more digital shopping carts;
comparing the cart product to one or more purchasing preferences associated with the list product;
assigning a purchasing preference weight to each of the one or more purchasing preferences, wherein the purchasing preference weight represents a relative importance of the one or more purchasing preference;

assigning a purchasing preference score to each of the one or more purchasing preferences, wherein the purchasing preference score represents how well the cart product matches the one or more purchasing preferences;

calculating a weighted purchasing preference score for each of the one or more purchasing preferences, wherein the weighted purchasing preference score is the product of the purchasing preference weight and the purchasing preference score of the one or more purchasing preferences;

calculating a product score, wherein the product score is an average of the weighted purchasing preference scores for each of the one or more purchasing preferences; and calculating a cart score, wherein the cart score is the sum of the product scores for each product in the one or more digital shopping carts.

16. The method of claim 15, wherein the assigning a purchasing preference score further comprises:

determining there is no cart product associated with the list product; and assigning a purchasing preference score of zero for each of the one or more purchasing preferences associated with the list product.

17. The method of claim 15, wherein the assigning a purchasing preference score further comprises:

determining that the cart product meets one of the one or more purchasing preferences associated with the list product; and assigning a purchasing preference score a perfect score for the one of the one or more purchasing preferences.

18. The method of claim 15, wherein the determining one or more preferred digital shopping carts comprises identifying one or more digital shopping carts with the highest total cart scores.

19. A system for automatically customizing electronic commerce, the system comprising:

a preference analysis device configured to analyze, automatically based on stored information without requiring a further input from a user, information relevant to a user's purchasing preferences and determine, automatically without requiring a further input from the user, based on the analysis of the relevant information, the user's purchasing preferences, the information relating to a plurality of retailers;

a shopping list device configured to determine, automatically without requiring a further input from the user, a shopping list, wherein the shopping list comprises one or more products the user wants to purchase and one or more indications of the user's purchasing preferences for each of the one or more products;

a cart generation device configured to generate, automatically without requiring a further input from the user, a digital shopping cart for each of the plurality of retailers based on the shopping list;

a cart scoring device configured to compare, automatically without requiring a further input from the user, a product in at least one of the digital shopping carts to a corresponding product and a corresponding purchasing preference on the shopping list and determine, automatically without requiring a further input from the user, based on the comparison, one or more preferred digital shopping carts; and an end user device configured to display, to the user, the one or more preferred digital shopping carts; and one or more databases configured to store information relevant to the user's purchasing preferences.

20. A computer program product for automatically customizing electronic commerce, the computer program product comprising a computer readable storage medium having program instructions embodied therewith, the program instructions executable by a processor to cause the processor to:

analyze, automatically based on stored information without requiring a further input from a user, information relevant to a user's purchasing preferences, the information relating to a plurality of retailers;

determine, automatically without requiring a further input from the user, based on the analysis of the relevant information, the user's purchasing preferences;

determine, automatically without requiring a further input from the user, a shopping list, wherein the shopping list comprises one or more products the user wants to purchase and one or more indications of the user's purchasing preferences for each of the one or more products;

generate, automatically without requiring a further input from the user, a digital shopping cart for each of the plurality of based on the shopping list;

compare, automatically without requiring a further input from the user, a product in at least one of the digital shopping carts to a corresponding product and a corresponding purchasing preference on the shopping list;

determine, automatically without requiring a further input from the user, based on the comparison, one or more preferred digital shopping carts; and display, to the user, the one or more preferred digital shopping carts.

* * * * *